Sept. 17, 1968      H. DE LANG      3,402,364

OPTICAL MASER WITH ROOF SYSTEM REFLECTOR UNDER 90°

Filed March 30, 1964      7 Sheets-Sheet 1

INVENTOR.
HENDRIK DE LANG
BY
AGENT

Sept. 17, 1968            H. DE LANG            3,402,364

OPTICAL MASER WITH ROOF SYSTEM REFLECTOR UNDER 90°

Filed March 30, 1964            7 Sheets-Sheet 2

INVENTOR.
HENDRIK DE LANG
BY
*Frank R. Trifari*
AGENT

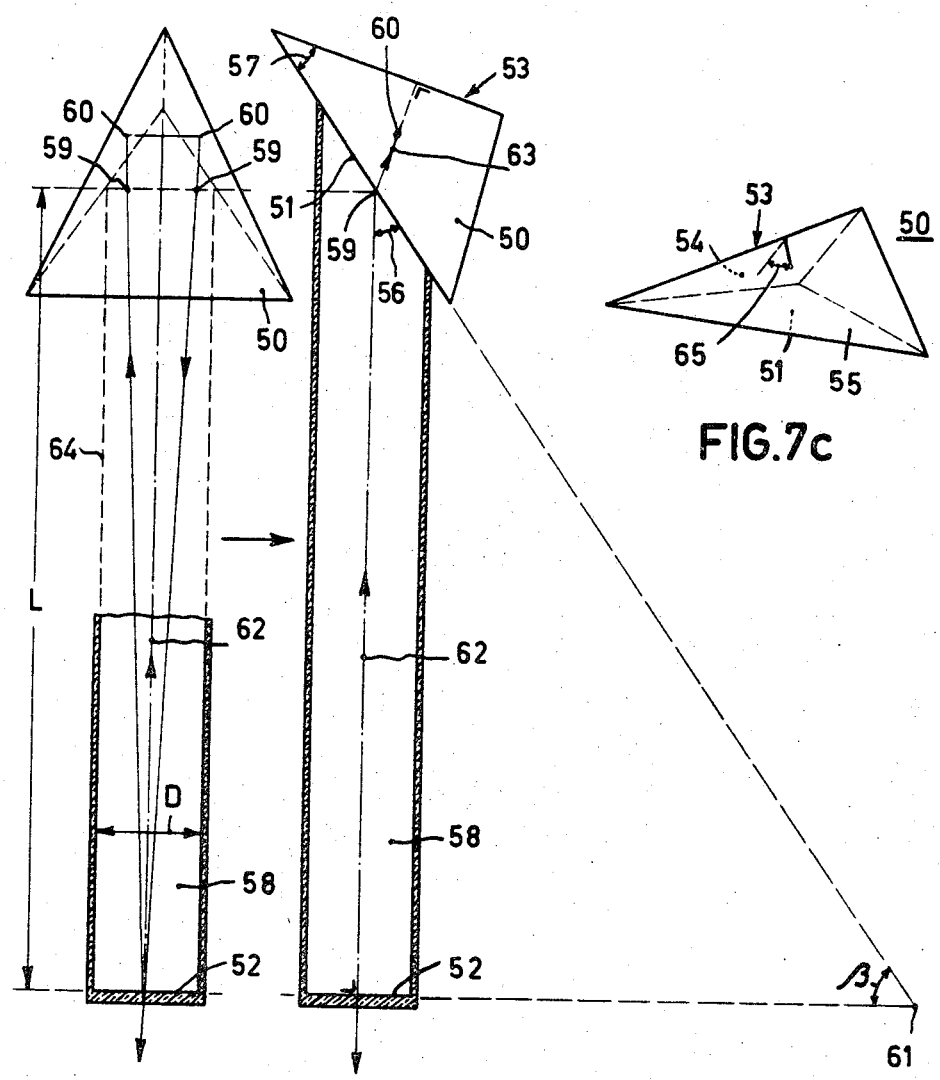

Sept. 17, 1968          H. DE LANG          3,402,364

OPTICAL MASER WITH ROOF SYSTEM REFLECTOR UNDER 90°

Filed March 30, 1964          7 Sheets-Sheet 7

INVENTOR.
HENDRIK DE LANG
BY
Frank R. Trifari
AGENT 3,402,364
OPTICAL MASER WITH ROOF SYSTEM
REFLECTOR UNDER 90°
Hendrik De Lang, Emmasingel, Eindhoven, Netherlands, assignor to North American Philips Company, Inc., New York, N.Y., a corporation of Delaware
Filed Mar. 30, 1964, Ser. No. 355,638
Claims priority, application Netherlands, Apr. 22, 1963, 291,813
16 Claims. (Cl. 331—94.5)

ABSTRACT OF THE DISCLOSURE

An optical maser comprising a masing medium and reflecting means at opposite ends. In one embodiment, one reflector forms a roof system having a roof angle between 80° and (90°—0°25") and the other reflector is flat. In another embodiment, both reflectors form roof systems with roof angles between 80° and (90°—0°25"), but the roof lines are perpendicular to one another. Among the advantages is the lack of criticality in making perfect 90° roof prism reflectors.

---

This invention relates to optical masers comprising two reflecting members separated by the active medium of the maser and in which radiation can travel to and fro between the reflecting members through the medium, at least one reflecting member having two substantially flat reflecting surfaces which make an angle with each other, the roof angle, thus determining a roof line. The roof line is the intersecting line of the planes in which the reflecting surfaces are situated. So the roof line may be the intersecting line of the reflecting surfaces or be situated outside the reflecting surfaces proper.

In known optical masers of the above-mentioned kind, the roof angle of a reflecting member is very accurately equal to 90 degrees of arc and differs therefrom by not more than a few seconds of arc. A roof angle which is very accurately 90 degrees of arc has been considered necessary for proper operation of such optical masers.

In fact, in this case, as viewed in a section at right angles to the roof line, a beam of rays incident on one reflecting surface of the reflecting member is reflected by the other reflecting surface thereof in parallel with the incident beam while upon a rotation over a small angle of the reflecting member about the roof line the reflected beam remains parallel to the incident beam which implies that the adjustment of the reflecting member is not critical in one degree of freedom.

The latter is an important advantage of reflecting members having two reflecting surfaces and a roof angle of 90 degrees of arc as compared with reflecting members having only one flat reflecting surface for which the adjustment is very critical in two degrees of freedom.

Reflecting members having a roof angle of 90 degrees of arc have the further advantage that total reflection can be used, thus minimizing the reflection losses.

Optical masers comprising a reflecting member having a roof angle of 90 degrees of arc suffer from the important disadvantage that the roof angle must be very accurately 90 degrees of arc and may differ therefrom by not more than a few seconds of arc.

This makes the manufacture of such an optical maser, especially of the reflecting member, extremely difficult and expensive.

It is an object of the invention, inter alia to provide optical masers comprising a completely novel type of reflecting members which require much less high accuracy in their manufacture than known optical masers comprising a reflecting member having a roof angle of 90 degrees of arc and which are thus considerably less expensive, while the said advantages such as the not very critical adjustment of the reflecting member in at least one degree of freedom and the possibility of using total reflection are retained.

According to the invention, an optical maser of the kind mentioned in the preamble is characterized in that the roof angle is less than 90 degrees of arc so that substantially parallel beam of rays can repeatedly and cyclically cover a closed optical path with a repetitive phase. The latter implies that the closed optical path is a whole number of wave-lengths of the radiation to be generated or amplified in the optical maser. The closed optical path may be, for example, substantially triangular. In this case the roof angle is preferably smaller by at least 25 seconds of arc, preferably by at least 60 seconds of arc, than an angle of 90 degrees of arc and the roof angle is greater than 35 degrees of arc, preferably greater than 80 degrees of arc.

The present invention is based inter alia on the recognition of the fact that in optical masers comprising a reflecting member having two substantially flat reflecting surfaces which make a roof angle with each other this roof angle need not necessarily be very accurately 90 degrees of arc, that an optical maser substantially no longer operates at a roof angle a little less than 90 degrees of arc inter alia because at most a very narrow beam of rays could then be produced in the optical maser which would be lost again by diffraction losses, but that an optical maser can operate very satisfactorily at roof angles which are still smaller, the value of such a smaller roof angle being very little critical so that the manufacturing cost is considerably reduced. The invention thus creates completely novel possibilities for the shaping of optical masers, especially for the reflecting members of optical masers.

The reflecting member having two reflecting surfaces determining a roof angle preferably comprises a translucent body having two side faces, which constitute the reflecting surfaces, and a third side face which constitutes the surface of entrance for radiation to be reflected.

The surface of entrance is in this case also the surface through which the reflected radiation leaves the body.

The term "translucent" is to be understood herein to mean transparent to radiation generated or amplified by the optical maser.

A first group of important embodiments of optical masers according to the invention is characterized in that one reflecting member has two substantially flat reflecting surfaces which make a roof angle with each other which is smaller by at least 25 seconds of arc, preferably by at least 60 seconds of arc, than an angle of 90 degrees of arc and which is greater than 35 degrees of arc and preferably greater than 80 degrees of arc, the other reflecting member having only one substantially flat reflecting surface, the third reflecting surface. It has been found that a rotational movement of one reflecting member with respect to the third reflecting surface about an arbitrary line in parallel with the roof line usually has little influence on the operation of such optical masers according to the invention, resulting in the important advantage that the adjustment of the reflecting member is not critical in one degree of freedom.

The roof line of one reflecting member may be substantially parallel to the third reflecting surface, whilst in a simple preferred embodiment in a section of the optical maser at right angles to the roof line of one reflecting member the bisector of the roof angle is approximately at right angles to the third reflecting surface.

This embodiment is found to operate very satisfactorily if the optical maser has a section at right angles to the roof line of one reflecting member in which the broadest, substantially rectangular portion of the medium which is located wholly between the reflecting members of which portion the perpendicular dropped from the roof angle on the third reflecting surface is approximately the axis of symmetry, has a width D and a mean length L, while for the complement of the roof angle there applies that this complement differs by not more than 60%, preferably by not more than 40%, from an angle $\alpha$ defined by:

$$\alpha = \frac{n_1}{n_2} \times \frac{D}{4L} \text{ radians}$$

wherein $n_1$ is the refractive index of the medium and $n_2$ is the refractive index of the material present between the reflecting surfaces of one reflecting member. $n_2$ may be, for example, the refractive index of the translucent body if one reflecting member is constituted by a translucent body or, for example, the refractive index of the medium ($n_2 = n_1$) if the medium is also present between the reflecting surfaces of one reflecting member. If one reflecting member is a translucent body the surface of entrance of this body may be approximately parallel to the third reflecting surface which gives a simple construction. If the medium of the optical maser comprises a solid body a very favourable configuration is obtained if the translucent body is integral with the solid body.

In the embodiment just described of an optical maser according to the invention, the surface of entrance of the translucent body is parallel to the third reflecting surface. In order to restrict troublesome reflections and reflection losses, the surface of entrance may be covered with an anti-reflection layer in a manner which is usual in optics. However, such anti-reflection layers are expensive and usually exhibit a small residual reflection of the incident radiation. An anti-reflection layer is not necessary in another preferred embodiment of an optical maser according to the invention in which one reflecting member comprises a translucent body having a roof line which is substantially parallel to the third reflecting surface. The said preferred embodiment is characterized in that the surface of entrance and the two reflecting surfaces of the translucent body determine three substantially parallel edges which are also substantially parallel to the third reflecting surface, while the entrance surface and the third reflecting surface make an angle approximately equal to the Brewster angle. The bisector of the roof angle, in a section at right angles to the roof line of the translucent body, then preferably has a position at which a light ray travelling from the roof angle along the bisector, after refraction by the entrance surface of the body is incident approximately at right angles on the third reflecting surface since this favourably affects the operation of the optical maser.

A Brewster angle is to be understood, as is usually the case, to mean an angle of incidence $\beta$ of a light ray on a translucent body having a refractive index $n_a$ for which there applies $\tan \beta = n_a / n_b$ where $n_b$ is the refractive index of the material from which the light ray is incident on the translucent body. In the foregoing and also hereinafter the Brewster angle will always be understood to mean an angle $\beta$ for which in the formula $\tan \beta = n_a / n_b$ which applies therefor $n_a$ is the refractive index of the translucent body of the relevant reflecting member and $n_b$ is the refractive index of the active medium of the optical maser.

Of a beam of rays which is incident on the surface of entrance of a translucent body at the Brewster angle only that component is reflected by the surface of entrance the electrical vector of which oscillates perpendicularly to the surface of incidence (the surface of incidence being the plane passing through the incident beam and a perpendicular to the surface of entrance). Due to this reflection of the said component, the operation of the optical maser for this component will usually be prevented, whereas for that component of the radiation the electrical vector of which oscillates in the plane of incidence substantially no reflection losses occur at the surface of entrance, the operation of the optical maser for the last-mentioned component normally being possible.

The last-mentioned preferred embodiment is found to operate very favourably if the optical maser has a section at right angles to the roof line of the translucent body in which the elongated portion of the medium located between the reflecting members, of which a light ray travelling in a direction at right angles to the third reflecting surface which light rays intersects the roof line after refraction by the entrance surface of the translucent body, is approximately the axis of symmetry, has a width D and a length L, measured approximately along the axis of symmetry, while for the complement of the roof angle there applies that this complement differs by not more than 60%, preferably by not more than 40%, from the angle $\alpha$ defined by:

$$\alpha = \frac{n_1^2}{n_2^2} \times \frac{D}{4L} \text{ radians}$$

wherein $n_1$ is the refractive index of the medium and $n_2$ is the refractive index of the translucent body.

Another preferred embodiment of an optical maser according to the invention in which one reflecting member comprises a translucent body having two reflecting surfaces determining a roof angle which is smaller by at least 25 seconds of arc, preferably by at least 60 seconds of arc, than an angle of 90 degrees of arc, whereas the other reflecting member has only one substantially flat reflecting surface, the third reflecting surface, and substantially no reflection losses occur at the surface of entrance of the translucent body, while an anti-reflection layer is not required, is characterized in accordance with the invention in that the surface of entrance of the translucent body and the third reflecting surface make an angle approximately equal to the Brewster angle and that the roof line determined by the reflecting surfaces of the translucent body lies substantially in a section at right angles to the surface of entrance and the third reflecting surface, the roof line in this section occupying a position at which a light ray travelling from the third reflecting surface in a direction substantially at right angles to this surface, after refraction by the surface of entrance, intersects the roof line substantially perpendicularly. The said section is preferably about the bisector plane of the roof angle.

The said preferred embodiment is found to operate very favourably if the optical maser has a section at right angles to the third reflecting surface and parallel to the intersecting line determined by the third reflecting surface and the surface of entrance of the translucent body, in which the substantially rectangular portion of the medium located between the reflecting members, of which the perpendicular dropped from the roof angle on the third reflecting surface is approximately the axis of symmetry, has a width D and a mean length L, while for the complement of the roof angle there applies that this complement differs by not more than 60%, preferably by not more than 40%, from an angle $\alpha$ defined by:

$$\alpha = \frac{n_1}{n_2} \times \frac{D}{4L} \text{ radians}$$

wherein $n_1$ is the refractive index of the medium and $n_2$ is the refractive index of the translucent body.

A second group of important embodiments of optical masers according to the invention is characterized in that each of the two reflecting members has two substantially flat surfaces which make an angle, the roof angle, with each other and thus determine a roof line, the roof angle being smaller by at least 25 seconds of arc, preferably by at least 60 seconds of arc, than an angle of 90 degrees of arc, whereas the roof angle is greater than an angle of 35 degrees of arc, preferably greater than an angle of 80 degrees of arc, while the roof lines cross each other substantially at right angles. The adjustment of the reflecting members has been found in this case to be not very critical in any respect so that the reflecting members can be adjusted very easily which is an important advantage.

In one simple embodiment the roof lines may be approximately at right angles to the longitudinal direction of the elongated portion of the medium present between the reflecting members and in sections of the optical maser at right angles to a roof line, the bisector of the roof angle associated with the relevant roof line preferably extends approximately in the longitudinal direction of the elongated portion of the medium present between the reflecting members.

This embodiment has been found to operate very favourably if the optical maser has a section at right angles to the roof line of one reflecting member as well as a section at right angles to the roof line of the other reflecting member, in which for the complement of the roof angle of the relevant reflecting member there applies that this complement differs by not more than 60%, preferably by not more than 40%, from an angle α defined by:

$$\alpha = \frac{n_1}{n_2} \times \frac{D}{4L} \text{ radians}$$

wherein $n_1$ is the refractive index of the medium and $n_2$ is the refractive index of the material present between the reflecting surfaces of the relevant reflecting member, while in the relevant section, D is the width of the broadest, substantially rectangular portion of the medium present between the reflecting members, of which portion the bisector of the relevant roof angle is approximately the axis of symmetry, and L is the mean length of the said substantially rectangular portion.

For the sake of simplicity, each reflecting member preferably comprises a translucent body having a surface of entrance and two reflecting side faces, the surface of entrance being approximately at right angles to the longitudinal direction of the elongated portion of the medium present between the reflecting members. Each surface of entrance may be provided with an anti-reflection layer to prevent any disadvantageous reflections.

A very simple configuration is obtained with a medium in the form of a solid body with which the translucent bodies are integral.

Another important embodiment of an optical maser according to the invention in which each reflecting member has two reflecting surfaces which determine a roof angle and for which anti-reflection layers are not required, is characterized in that the two reflecting members comprise translucent bodies the surfaces of entrance of which are approximately parallel to each other and make an angle with the axis of the elongated portion of the medium present between the reflecting members which angle is approximately equal to the complement of the Brewster angle, the reflecting surfaces and the surface of entrance of one body determining three substantially parallel edges crossing the said axis substantially at right angles, whereas the reflecting surfaces of the other body determine a roof line having a position at which light rays travelling parallel to the said axis and incident from the medium on the surface of entrance of the other body, after refraction by the surface of entrance, cross the roof line approximately at right angles.

The term "axis" is to be understood herein to mean a line interconnecting the surfaces of entrance of the translucent bodies and extending approximately through the centre line of the said elongated portion of the medium.

In a section at right angles to the roof line of one translucent body, the bisector of the roof angle of one body preferably occupies a position at which a light ray travelling from the roof angle along this bisector, after refraction by the entrance surface of one body, is approximately parallel to the axis of the elongated portion of the medium present between the reflecting members, while a plane passing through the roof line of the other translucent body and which is approximately at right angles to the surface of incidence of this body, is preferably approximately the bisector plane of the roof angle of this other body. The operation of the optical maser is favourably influenced thereby.

This embodiment has been found to operate very favourably if the optical maser has a section substantially at right angles to the three substantially parallel edges determined by the said side faces of one translucent body, in which the elongated portion of the medium present between the reflecting members, as measured approximately parallel to the axis of this portion, has a mean length L and a width $D_1$, while for the complement of the roof angle of one body there applies that this complement differs by not more than 60%, preferably by not more than 40%, from an angle $\alpha_1$, defined by:

$$\alpha_1 = \frac{n_1^2}{n_2^2} \times \frac{D_1}{4L} \text{ radians}$$

wherein $n_1$ is the refractive index of the medium and $n_2$ is the refractive index of one body, and if the optical maser has another section substantially at right angles to the first-mentioned section and substantially parallel to the said axis, in which the substantially rectangular portion of the medium present between the reflecting members has a width $D_2$ while for the complement of the roof angle of the other body there applies that this complement differs by not more than 60%, preferably by not more than 40%, from an angle $\alpha_2$ determined by:

$$\alpha_2 = \frac{n_1}{n_3} \times \frac{D_2}{4L} \text{ radians}$$

wherein $n_3$ is the refractive index of the other translucent body.

The above-mentioned embodiments of optical masers according to the invention, in which at least one reflecting member comprises a translucent body the surface of entrance of which makes an angle approximately equal to the Brewster angle with the third reflecting surface, or an angle approximately equal to the complement of the Brewster angle with the longitudinal direction or axis of the elongated portion of the medium present between the reflecting members, are especially important for the use of gaseous or liquid active media.

The invention also relates to a reflecting member comprising a translucent body having two substantially flat side faces, the reflecting surfaces, which make an angle, the roof angle, with each other and thus determine a roof line, the roof angle being smaller by at least 25 seconds of arc, preferably by at least 60 seconds of arc, than an angle of 90 degrees of arc and the roof angle being larger than an angle of 35 degrees of arc, preferably larger than an angle of 80 degrees of arc, and having a third side face which constitutes the surface of entrance for radiation to be reflected and wherein in a section of the translucent body at right angles to the roof line, while the intersecting lines of this section determine with the said side faces a substantially isosceles triangle suitable for use in an optical maser according to the invention.

In order that the invention may readily be carried into effect, several embodiments will now be explained in detail, by way of example, with reference to the accompanying diagrammatic drawings, in which:

FIGURE 1 is a diagrammatic and perspective view of a portion comprising the active medium of one embodiment of an optical maser according to the invention, of which

FIGURE 7a is a diagrammatic side-view of the portion comprising the active medium of a further embodiment of an optical maser according to the invention, of which FIGURE 7b is a diagrammatic cross-sectional view and of which FIGURE 7c is a diagrammatic and perspective view of a reflecting member.

FIGURE 8a is a diagrammatic and perspective view of yet another embodiment of an optical maser according to the invention, of which

The embodiments of optical masers according to the invention to be described hereinafter comprising two reflecting members separated by the active medium, in which radiation can travel to and fro between the reflecting members through the medium and in which at least one reflecting member has two substantially flat, reflecting surfaces which make an angle, the roof angle, with each other and thus determine a roof line, have, without exception, a roof angle less than 90 degrees of arc so that substantially parallel beam of rays can repeatedly and cyclically cover a closed optical path with a periodical phase, the roof angle being smaller by at least 25 seconds of arc than an angle of 90 degrees of arc and greater than an angle of 35 degrees of arc.

The roof angle is preferably smaller by at least 60 seconds of arc than an angle of 90 degrees of arc, which condition is fulfilled by all the embodiments to be described, while the roof angle is preferably greater than 80 degrees of arc, which condition is fulfilled by all the embodiments to be described, except the first.

At first embodiments will be described in which the other reflecting member has only one substantially flat reflecting surface, the third reflecting surface.

Figure 1:
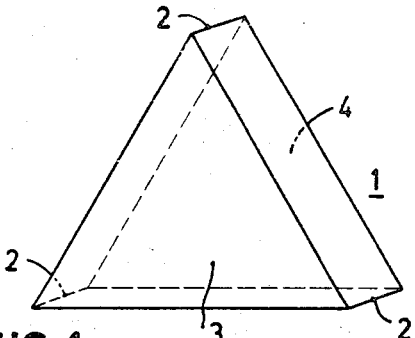
Figure 2:
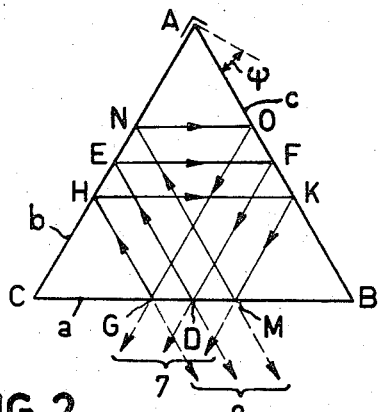
FIGURE 2 is a diagrammatic cross-sectional view.

FIGURES 1 and 2 relate to an extreme shape of an optical maser according to the invention by means of which the principles underlying the invention can, however, be readily appreciated.

The triangle ABC in FIGURE 2 is a section at right angles to three substantially parallel edges 22 of a body 1 (FIGURE 1) in the form of a prism comprising a solid active medium, for example, a ruby. The sides $b$ and $c$ (FIGURE 2) must be regarded as the reflecting surfaces of one reflecting member which make the roof angle A with each other. The roof line passes through A and is at right angles to the plane of the drawing. The side $a$ is the third reflecting surface. The roof line passing through A is thus parallel to the third reflecting surface.

The side faces $a$, $b$ and $c$ may be given a satisfactory reflective power by covering each with a metallic layer, for example, a silver layer. The side face $a$ is partially permeable to radiation. (The permeability is, for example, 5%.)

The triangle DEF is the pedal points triangle of the triangle ABC. (The points D, E and F are the pedal points of the perpendiculars dropped from the opposite angles of the triangle ABC on sides $a$, $b$ and $c$ respectively.)

Radiation waves generated in the medium can travel along the sides of the pedal-point triangle DEF since the angle of incidence on the sides $a$, $b$ and $c$ is then always equal to the angle of reflection.

Generated radiation waves can also travel along light paths of the same kind as the light path G, H, K, M, N, O, G, where G is an arbitrary point of the side $a$. The said light path is always parallel to one side of the triangular light path DEF.

During operation of the optical maser a substantially parallel light beam 7 is thus obtained which emerges through the partially permeable third reflecting surface $a$.

Radiation waves may also travel in a direction opposite to that shown in FIGURE 1, so that a substantially parallel beam of rays 8 can also emerge during operation.

As is well-known, to make an optical maser operative by generating radiation in its medium, it is necessary to supply energy (pump energy) to the medium in order to bring at least the greatest proportion of the active centres of the medium into an excited state of energy so that such centres can emit radiation and radiation already emitted induces the emission of further radiation. To this end, the radiation already emitted must be capable of covering a long path in the medium which is possible by means of two reflecting members between which the radiation can travel to and fro through the medium. From FIGURE 2 it may be seen that radiation can travel to and fro between the reflecting member comprising the reflecting surfaces $b$ and $c$ and the reflecting member comprising the reflecting surface $a$.

The pump energy sources are not essential to the invention and therefore not shown.

If the medium is solid material, for example, a ruby or calcium fluoride activated with urea or samarium, the sources for the pump energy may comprise radiation sources, for example, high-pressure mercury lamps. Thus, the body 1 in FIGURE 1 may be irradiated through its front and rear surfaces 3 and 4 respectively.

The roof angle A (FIGURE 2) has a value of about 60 degrees of arc (the triangle ABC is approximately isosceles), the pedal points D, E and F lying approximately midway on the sides $a$, $b$ and $c$. The roof angle A thus differs by 30 degrees of arc (see the angle $\Psi$) from an angle of 90 degrees of arc. In this case the medium is traversed by radiation substantially throughout its section via light paths of the kind shown in FIGURE 2 so that an optimum use is made of the whole of the medium.

If the angle A is larger than 60 degrees of arc the pedal points E and F come to lie closer to A so that portions of the medium at the corners C and B are not used during operation. If the angle A is less than 60 degrees of arc a portion of the medium at the corner A is not used. However, it will be evident that the value of the angle A is not very critical and may be chosen within wide limits. The isoscelescy of the triangle ABC is likewise not very critical. It is sufficient that the points D, E and F lie at some distance from the points A, B and C on the sides $a$, $b$ and $c$. The optical maser can thus be manufactured with wide tolerance limits and at low cost.

Figure 3:
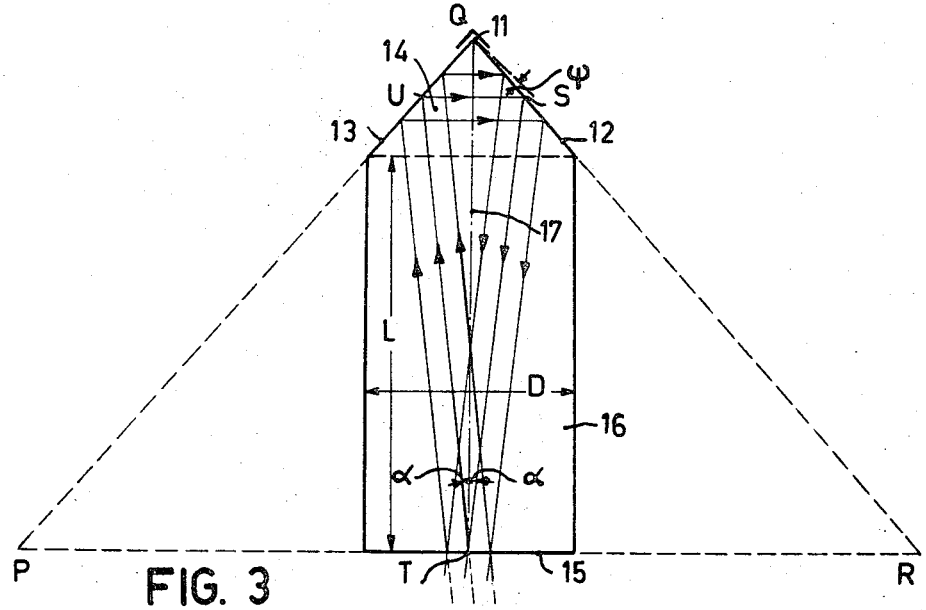
FIGURES 3 to 6 are diagrammatic and cross-sectional views of the portion comprising the active medium of several embodiments of optical masers according to the invention.

A larger distance between the reflecting members is usually desirable, as is the case in the embodiment shown in FIGURE 3.

FIGURE 3 is a cross-sectional view of a simple configuration in which the medium is a solid rectangular body 16 and one reflecting member comprises a translucent body 14 which is integral with the body 16.

A roof line 11 is at right angles to the plane of the drawing, as are reflecting surfaces 12 and 13 of the translucent body 14 having a triangular section. The roof line 11 is in practice parallel to a third reflecting surface 15. The translucent body 14 and the body 16 may comprise, for example, a single ruby shaped into the desired form. The third reflecting surface 15 may be a metallized surface of the body 16 which is partially permeable. With the dimensions of the body 16 as usually employed for optical masers, total reflection will usually occur at the reflecting surfaces 13 and 12, so that these surfaces need not be covered with additional reflecting layers.

A bisector 17 of a roof angle Q is preferably approximately at right angles to the third reflecting surface 15 since in this case radiation to be generated passes through substantially the whole of the body 16. The position of the bisector 17 is otherwise not very critical, which facilitates the manufacture of the optical maser.

The body 16, together with the translucent body 14, may be regarded as a portion of a body in the form of a prism having a triangular cross-section PQR in which the triangle STU is the pedal-point triangle.

FIGURE 3 shows light paths analogous to those in FIGURE 2. Thus the triangular light path STU is comparable to the triangular light path DEF in FIGURE 2.

The optical angle Q must be smaller than 90 degrees of arc but must preferably have a value such that the pedal points S and U lie approximately midway on the sides 12 and 13 since in this case substantially the whole of the medium is used.

This condition is fulfilled if, in the illustrated section at right angles to the roof line 11 of the reflecting member (12, 13, 14), the complement $\Psi$ of the roof angle Q is approximately equal to an angle $\alpha$ for which applies:

$$\alpha = \frac{n_1}{n_2} \times \frac{D}{4L} \text{ radians}$$

wherein D is the width of the broadest, substantially rectangular portion 16 of the medium located between the reflecting members, (12, 13, 14) and 15 and L is the (mean) length. The bisector 17 is in practice the perpendicular dropped from the roof angle Q on the third reflecting surface 15 and also in practice an axis of symmetry of the rectangular portion 16. $n_1$ is the refractive index of the medium 16 and $n_2$ is the refractive index of the translucent body 14. Since the bodies 16 and 14 form a unit in the present example $n_1 = n_2$ and for the angle $\alpha$ there applies the simplified formula:

$$\alpha = D/4L \text{ radians}$$

This formula can be deduced in a simple manner with the aid of FIGURE 3. Since the triangle STU is a pedal-point triangle the angles $\alpha$ are equal to the complement $\Psi$ of the angle Q. Also there applies that $\alpha = \frac{1}{4}D/L$ or, since $\alpha$ is a small angle and hence sine $\alpha \approx \alpha$ in radians, $= D/4L$ radians.

If D is, for example, 0.5 cms. and L is 2 cms. the value of the angle $\alpha$ is about $\frac{1}{16}$ radian, corresponding to about 3.5 degrees of arc. In the present example, the value of the angle Q is thus about 86.5 degrees of arc.

In the optical maser just described, the complement $\Psi$ of the roof angle is thus exactly $L/4D$ radians. This is not necessary in practice. It has been found that the maser can generally still operate satisfactorily if the deviation is 60% of $L/4D$ radians. Preferably, the value of the said complement differs by not more than 40% from $L/4D$ radians. Since the value of the complement $\Psi$ is not critical the optical maser can be manufactured in a simple manner and at low cost. This also applies to the other embodiments to be described.

The bodies 14 and 16 may extend through any arbitrary length in a direction at right angles to the plane of the drawing in FIGURE 3.

The pump radiation may be radiated into the body 16 in the usual manner from the side.

Figure 4:
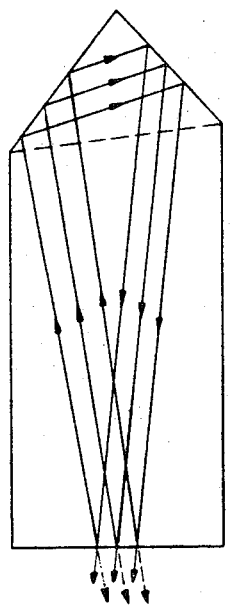

It may appear from FIGURE 4 and also from FIGURE 3 that radiation can still travel to and fro between the reflecting members (12, 13, 14) and 15 even when the body 14 is slightly rotated with respect to the third reflecting surface about a line parallel to the roof line 11, which implies that the adjustment of the reflecting member (12, 13, 14) is not critical in one degree of freedom.

Figure 5:
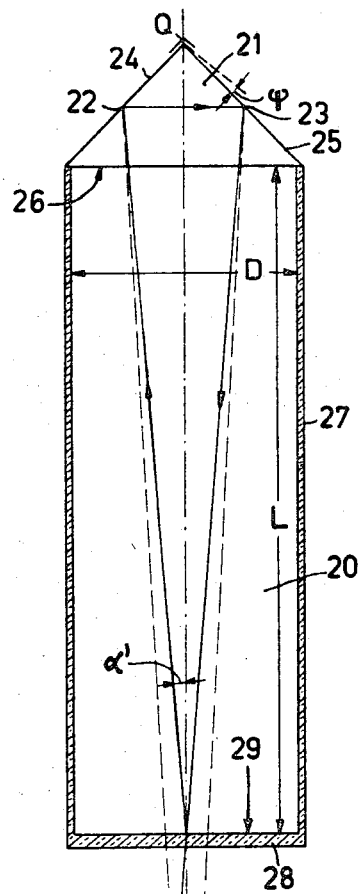

FIGURE 5 is a diagrammatic cross-sectional view of one embodiment of an optical maser according to the invention in which a medium 20 and a translucent prism 21 have different refractive indices.

The illustrated path of rays approximately corresponds to that according to the pedal-point triangle STU in FIGURE 3. (Further light paths are not shown for the sake of clarity). However, in this case, refraction occurs at the entrance surface 26 of the translucent body 21, resulting in a small deviation from the example described with reference to FIGURE 3.

For the angle $\alpha^1$ there applies approximately:

$$\alpha^1 = D/4L \text{ radians}$$

(Let it be assumed that the points 22 and 23 lie approximately midway on the reflective sides 24 and 25 of the prism 21.) If $n_2$ is the refractive index of the translucent body 21 and $n_1$ is that of the medium 20 there applies the relationship:

$$\alpha = \frac{n_1}{n_2} \alpha^1 \text{ (in radians)}$$

Since the complement $\Psi$ of the roof angle Q is in this case equal to the angle $\alpha$, the value of this complement is $$\frac{n_1}{n_2} \times \frac{D}{4L} \text{ radians}$$

The medium is in this case, for example, gaseous and is composed, for example, of a mixture of helium and neon as usually employed for gas masers, the refractive index of which is about 1 ($n_1 = 1$). The medium is contained in a quartz tube 27, closed at one end by the translucent body 21, for example, of quartz having a refractive index about equal to 1.5 ($n_2 = 1.5$). At its other end, the tube is closed by a plate 28, for example, of quartz, having an interference mirror layer 29, the third reflecting surface.

The tube 27 has a length of, say, 100 cms. and an internal diameter of 2 cms.

The value of the complement $\Psi$ of the roof angle Q is then approximately $$\frac{1}{1.5} \times \frac{2}{4 \times 100} = \frac{1}{300}$$

radian, which corresponds to about 680 seconds of arc, the value of the angle Q thus being a little less than 89 degrees of arc and 49 minutes of arc.

The pump energy may in this case be supplied by means of a gaseous discharge in the mixture of helium and neon. To this end, discharge electrodes (not shown in FIGURE 5) are sealed in the tube 27.

Deviations up to approximamtely 60% of the complement of the roof angle Q with respect to an angle having a value of $$\frac{n_1}{n_2} \times \frac{D}{4L}$$

radians are permissible, but such deviations are preferably not greater than 40%.

The entrance surface 26 of the translucent body 21 is preferably approximately parallel to the third reflecting surface 29 in order to limit any troublesome reflections, while the entrance surface 26 is also preferably covered with an anti-reflection layer.

Figure 6:
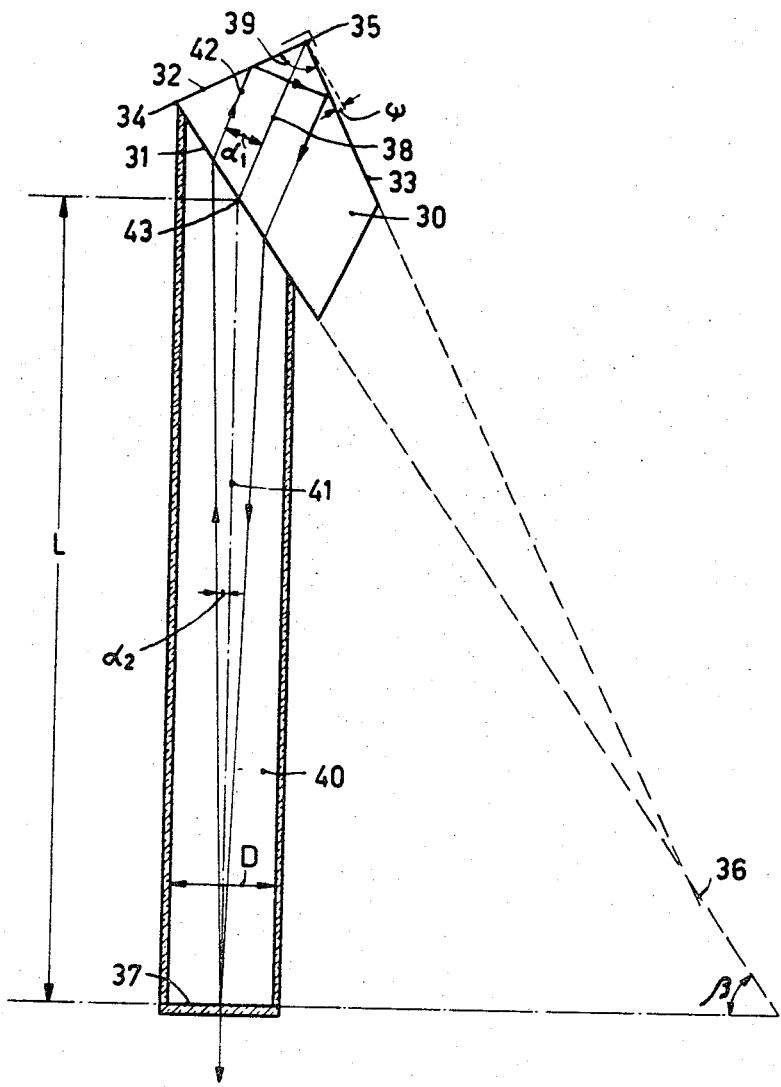

An anti-reflection layer, which is costly and usually exhibits some residual reflection for incident radiation, is not necessary in the embodiment of an optical mazer shown in FIGURE 6.

In this embodiment an entrance surface 31 and reflecting surfaces 32 and 33 of a translucent body 30 determine three substantially parallel edges (at right angles to the plane of the drawing) 34, 35 and 36, which are also substantially parallel to a third reflecting surface 37, the entrance surface 31 and the third reflecting surface 37 making an angle $\beta$ equal to the Brewster angle.

In this case the radiation travelling to and fro between the reflecting members, comprising the translucent body 30 and the third reflecting surface 37 is incident on the entrance surface 31 at an angle of incidence approximately equal to the Brewster angle so that, as previously explained, the radiation oscillating in parallel with the plane of incidence does not substantially undergo any reflection losses at the entrance surface 31.

A bisector 38 of a roof angle 39 occupies, in the illustrated section, a position at which a light ray travelling from the apical angle 39 along the bisector 38, after refraction by the entrance surface 31, is incident almost perpendicularly on the third reflecting surface 37. An optimum use is then made of the medium 40. The position of the bisector 38 has otherwise been found to be not very critical.

The present embodiment is based on the same principles as the preceding embodiments and has been found to operate very favourably if, in the illustrated section at right angles to the roof line 35 of the translucent body 30, the elongated portion of the medium 40 located between the reflecting members (the medium may in certain cases extend beyond the region located between the reflecting members 30 and 37, in a direction parallel to the third reflecting surface 37), of which portion, a light ray travelling in a direction at right angles to the third reflecting surface 37 and, after refraction by the entrance surface 31, intersecting the roof line 35 is approximately the axis of symmetry 41, has a width D and a length L, as measured approximately along the axis of symmetry 41, and for the complement Ψ of the roof angle 39 there applies that this complement Ψ differs by not more than 60%, preferably by not more than 40%, from an angle α defined by:

$$\alpha = \frac{n_1^2}{n_2^2} \times \frac{D}{4L} \text{ radians}$$

wherein $n_2$ is the refractive index of the body 30 and $n_1$ is the refractive index of the medium 40.

The optical maser is otherwise, for example, analogously built up from and consists of the same materials as the optical maser described with reference to FIGURE 5, the dimensions D and L in each case being, for example, also the same.

The complement Ψ of the roof angle 35 is then in the present example preferably about $$\frac{1}{1.5^2} \times \frac{2}{4 \times 100} \text{ radians} \approx 400 \text{ seconds of arc}$$

and the roof angle 35 is about 89 degrees of arc and 53.5 minutes of arc.

The factor $n_1^2/n_2^2$ in the formula for the angle α is caused in this case because for the angle $\alpha_1$ (equal to the complement Ψ) between the light ray 42 and the bisector 38 there applies:

$$\alpha_1 = \frac{n_1^2}{n_2^2} \alpha_2 \text{ (in radians)}$$

since the entrance surface 31 and the third reflecting surface 37 make an angle β equal to the Brewster angle and such an angle is defined by the relationship $$\tan \beta = n_2/n_1$$

Furthermore there applies:

$$\alpha_2 = \approx D/4L \text{ radians}$$

for the optimum case as illustrated in FIGURE 6, or $$\alpha_1 = \frac{n_1^2}{n_2^2} \times \frac{D}{4L} \text{ radians}$$

Another important embodiment of an optical maser according to the invention in which an entrance surface 51 of a translucent body 50 and a third reflecting surface 52 make an angle β equal to the Brewster angle is shown in FIGURES 7a, 7b and 7c. FIGURE 7b is a sectional view of the optical maser at right angles to the entrance surface 51 and the third reflecting surface 52. FIGURE 7a is a side view of the optical maser in the direction indicated by the arrow in FIGURE 7b. FIGURE 7c is a perspective elevational view of one reflecting member in the form of the translucent body 50.

A roof line 53 determined by reflecting surfaces 54 and 55 of the translucent body 50 lies in the said cross-section shown in FIGURE 7b. The roof line occupies in this section a position at which a light ray (see the light ray (62, 63)) travelling in a direction substantially at right angles from the third reflecting surface 52, after refraction by the entrance surface 51, intersects the roof line 53 substantially at right angles. This implies that in FIGURE 7b the angles 57 and 56 are equal to the complement of the angle β since for the Brewster angle β there applies $\tan \beta = n_1/n_2$ whereas if a light ray is incident on a translucent body at the angle of incidence β, the angle of refraction and the angle β are together 90 degrees of arc ($n_2$ is the refractive index of the body 50 and $n_1$ is the refractive index of a medium 58).

The plane of the cross-section shown in FIGURE 7b is preferably the bisector plane of a roof angle 65 which is determined by the reflecting side faces 54 and 55 of the body 50.

The substantially triangular light path shown in FIGURE 7a is similar to that described with reference to the preceding embodiments. As viewed in a direction at right angles to the section of FIGURE 7b, this triangular light path coincides with the light ray (62, 63) shown in FIGURE 7b. The bend at the points 59 on the entrance surface 51 is caused by refraction. The points 60 are the points on the reflecting surfaces 54 and 55 where the radiation following the said triangular light path is reflected by the surfaces 54 and 55.

The present optical maser has been found to operate very satisfactorily if it has a cross-section at right angles to the third reflecting surface 52 and parallel to the intersecting line 61 determined by the third reflecting surface 52 and the entrance surface 51 (in the present example, for instance, the plane passing at right angles to the plane of the drawing in FIGURE 7b through the illustrated light ray 62) in which a substantially rectangular portion 64 of the medium 58 located between the reflecting members (50 and 52), of which the perpendicular (coincident with the light ray 62) dropped from the roof angle on the third reflecting surface 52 is approximately the axis of symmetry (it is conceivable that the medium 58 laterally extends outside the said rectangular portion), has a width D and a mean length L, and for the complement of the roof angle 65 determined by the surfaces 54 and 55 there applies that this complement differs by not more than 60%, preferably by not more than 40%, from an angle a defined by:

$$\alpha = \frac{n_1}{n_2} \times \frac{D}{4L} \text{ radians}$$

The complement of the roof angle 65 is preferably substantially equal to the angle a and since the formula of the angle a has the same form as in the embodiment described with reference to FIGURE 5, the roof angle has in each case the same value. In this connection it is to be noted that also in each case the same materials are used and the dimensions D and L are the same.

Now several important embodiments of optical masers according to the invention will be described in which each of the two reflecting members has two substantially flat reflecting surfaces which make an angle, the roof angle with each other and thus determine a roof line, the roof angle being smaller, by at least 25 seconds of arc, preferably by at least 60 seconds of arc, than an angle of 90 degrees of arc and being greater than an angle of 35 degrees of arc, preferably greater than an angle of 80 degrees of arc, while the roof lines intersect approximately at right angles.

At first a simple embodiment (see FIGURES 8a and 8b) will be described in which roof lines 70 of reflecting members, which again comprise translucent bodies 71, intersect substantially at right angles and are also approximately at right angles to the longitudinal direction of the elongated portion of a medium 72 present between the reflecting members 71, while in section 73 of the optical maser at right angles to a roof line 70, a bisector 74 of a roof angle 75 associated with the relevant roof line 70 extends approximately in the longitudinal direction of the elongated portion of the medium 72 present between the reflecting members 71.

Entrance surfaces 76 of the translucent bodies 71 in the form of prisms are substantially at right angles to the longitudinal direction of the elongated medium 72 present between the reflecting members 71.

The medium 72 comprises a solid body with which the translucent bodies 71 are integral. The whole comprises, for example, a ruby formed into the desired shape. It is also possible that the reflecting members 71 are of a material different from that of the medium 72, for example, of quartz or glass. The translucent bodies 71 may then be joined to the medium 72 by cementing. In this case the two translucent bodies 71 may also be made from different materials.

Figure 8A:
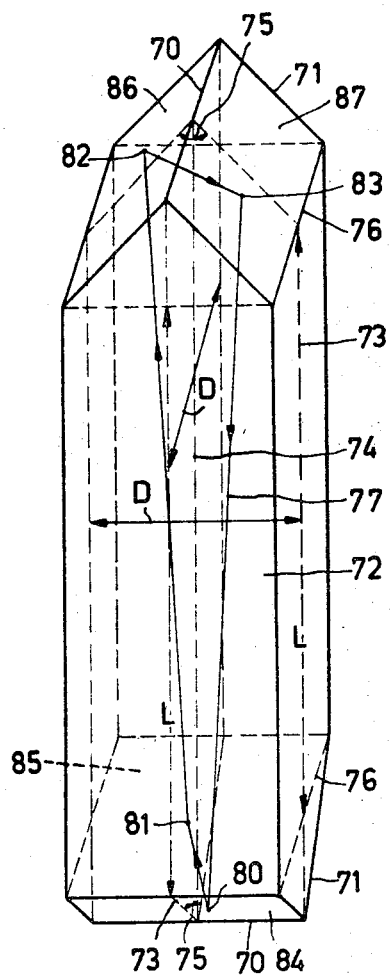
Figure 8B:
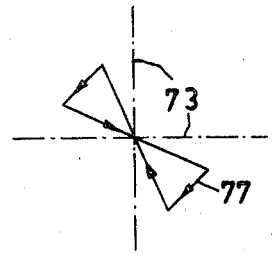
FIGURE 8b shows diagrammatically the projection of a light ray which occurs during operation.

In the described configuration shown in FIGURE 8a, a closed light path occurs, of which a ray 77 is shown having inflection points 80, 81, 82 and 83, which are located on reflecting side faces 84, 85, 86 and 87 of the translucent bodies 71. The ray 77 is projected on an arbitrary plane at right angles to the longitudinal direction of the medium 72, in a form as illustrated in FIGURE 8b. Radiation can travel to and fro between the reflecting members 71 via light paths which are always parallel to one side of the quadrangle (80, 81, 82, 83) formed by the ray 77, in a similar manner as in the preceding embodiments radiation can travel to and fro between the reflecting members via light paths which are always parallel to one side of a triangular (or at least substantially triangular) light path. Compare, for example, the light paths G, H, K, M, N, O, G and DEF in FIGURE 2.

FIGURE 8a shows only the simplest closed ray 77 for the sake of clarity.

The optical maser of FIGURE 8a operates very satisfactorily if it has a cross-section 73 at right angles to the roof line 70 of one reflecting member 71 as well as a cross-section 73 at right angles to the roof line 70 of the other reflecting member 71, in which for the complement of the roof angle 75 of the relevant reflecting member 71 there applies that this complement differs by not more than 60%, preferably by not more than 40%, from an angle α defined by:

$$\alpha = \frac{n_1}{n_2} \times \frac{D}{4L} \text{ radians}$$

wherein $n_1$ is the refractive index of the medium 72 and $n_2$ is the refractive index of the relevant translucent body 71, while in the relevant section, D is the width of the broadest substantially rectangular portion of the medium 72 present between the reflecting members, of which portion the bisector 74 is approximately the axis of symmetry, and L is the mean length of this substantially rectangular portion. It is to be noted that the medium may extend, if desired, beyond the region located between the reflecting members 71.

In the present example, the translucent bodies 71 are integral with the medium 72 so that $n_1 = n_2$. The formula of the angle α then has the same form as in the optical maser described with reference to FIGURE 3. The present maser is furthermore built up from the same materials as those in FIGURE 3 and D and L have in each section 73, the same values as in the section of FIGURE 3. So the roof angles 75 are preferably equal to the roof angle of the optical maser of FIGURE 3.

It is to be noted that it is not necessary for D and L to have the same value in each section 73. They may slightly differ and the roof angles may likewise slightly differ (also independently of any differences between D and L in the two sections 73).

The adjustment of the reflecting members 71 is very simple in the present optical maser. A slight rotation of a reflecting member 71 about an arbitrary axis has been found to have very little influence on the operation of the optical maser.

An emerging beam of rays may be obtained via one or more of the reflecting surfaces 84, 85, 86 and 87 of the translucent bodies 71 by means of the phenomenon of frustrated total reflection which is known per se in optics. The principle thereof is shown diagrammatically and in section in FIGURE 9. A light beam 91 reflected by a surface 90 provides a reflected beam 92 by means of total or substantially total reflection. A continuous beam or an extremely weak continuous (refracted) beam would normally not occur. When a translucent prism 94 is brought close to the reflecting surface 90 a continuous beam 93 occurs due to frustrated total reflection. The distance between the prism 93 and the surface 90 must be smaller than the wave-length of the radiation 91. The intensity of the emerging beam 93 may be controlled by adjusting the said distance.

An optical maser having a gaseous or liquid medium may be built up in a similar manner as the optical maser of FIGURE 5, each end of a holder 27 for the medium being closed by a translucent body in the form of a prism. The entrance surface of each translucent body is then preferably covered with an anti-reflection layer. Such anti-reflection layers are not necessary in the embodiment to be described hereinafter with reference to FIGURES 10a and 10b, which is especially important for the use of gaseous and liquid media. FIGURE 10b shows a section of the optical maser to be described and FIGURE 10a is a side view thereof in the direction indicated by the arrow in FIGURE 10b.

Figure 10A:
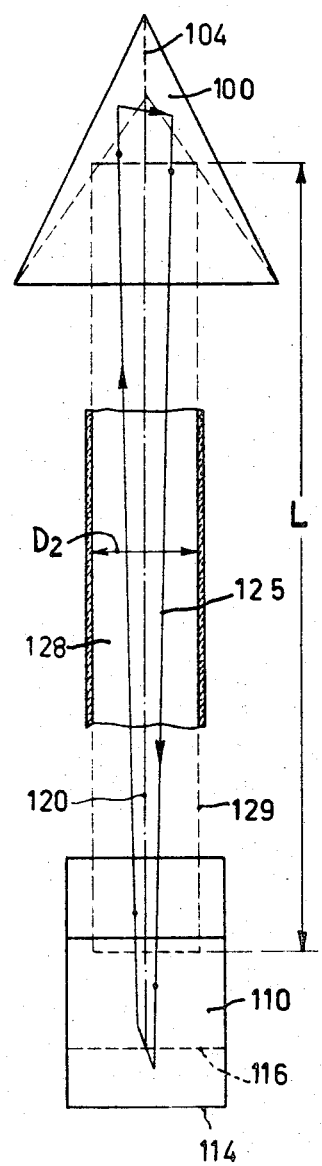
FIGURES 10a and 10b show diagrammatically a side view and a cross-sectional view, respectively, of the portion comprising the active medium of still another embodiment of an optical maser according to the invention.
Figure 10B:
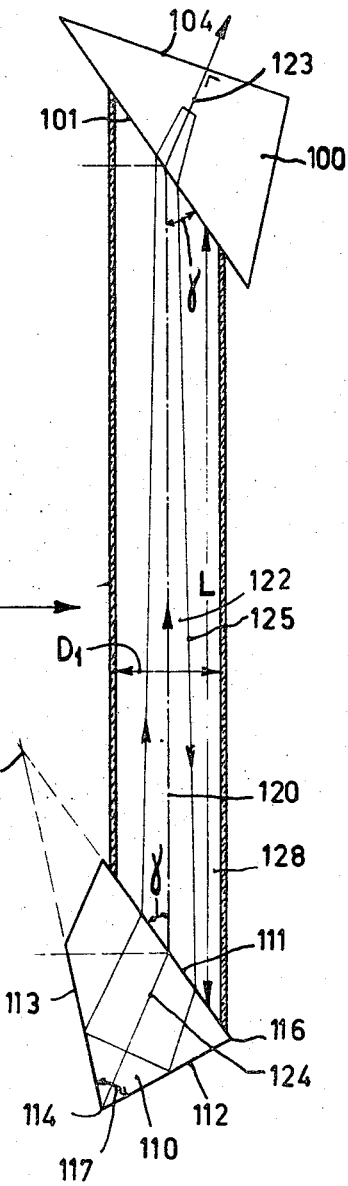

In the optical maser shown in FIGURES 10a and 10b the reflecting members comprise translucent bodies 100 and 110 respectively, their entrance surfaces 101 and 111 being approximately parallel to each other and making an angle γ with the axis 120 of the elongated portion of a medium 121 present between the reflecting members 100 and 110, which angle is approximately equal to the complement of the Brewster angle. Reflecting surfaces 112 and 113 and the entrance surface 111 of the translucent body 110 determine three substantially parallel edges 114, 115 and 116, which intersect the axis 120 approximately at right angles. A roof line 104 of the translucent body 100 is intersected perpendicularly by light rays which are incident on the entrance surface 101 in parallel with the axis 120 and then refracted by the entrance surface 101. See a light ray 122 shown along the axis 120 and the refracted light ray 122 in FIGURE 10b.

Since the entrance surfaces 101 and 111 and the axis 120 make an angle γ about equal to the complement of the Brewster angle substantially no reflection of radiation oscillating in the plane of incidence occurs at the entrance surfaces 101 and 111.

It is to be noted that the roof lines 104 and 114 intersect approximately at right angles. The adjustment of the translucent bodies 100 and 110 has been found to be as easy as in the preceding example.

In a section at right angles to the roof line 114 a bisector 124 of a roof angle 117 of the translucent body 110 preferably occupies a position at which a light ray travelling from the roof angle 117 along the bisector 124, after refraction by the entrance surface 111, is parallel to, or coincident with, the axis 120. In the section shown in FIGURE 10b, the refracted light ray coincides with the axis 120.

A plane passing through the roof line 104 and at right angles to the entrance surface 101 (the plane of the drawing in FIGURE 7b) is preferably the bisector plane of the roof angle of the translucent body 100. This implies that the plane of the drawing in FIGURE 7b is a plane of symmetry of the translucent body 100.

The closed quadrangular ray 77 in FIGURE 8a assumes, due to refraction by the entrance surfaces 101 and 111, a shape as illustrated in FIGURES 10a and 10b (see the ray indicated by 125).

The light ray 125 is not located in the section of FIGURE 10b but projected at right angles thereto.

The optical maser shown in FIGURES 10a and 10b operates very satisfactorily if the optical maser has a section substantially at right angles to the three substantially parallel edges 114, 115 and 116 of the translucent body 110 (in the present example the plane of the drawing of FIGURE 10b), in which the elongated portion of a medium 128 present between the reflecting members, as measured approximately parallel to the axis 120, has a mean length L ad a width $D_1$, and for the complement of the roof angle 117 there applies that this complement differs by not more than 60%, preferably by not more than 40%, from an angle $\alpha_1$ determined by:

$$\alpha_1 = \frac{n_1^2}{n_2^2} \times \frac{D_1}{4L} \text{ radians}$$

wherein $n_1$ is the refractive index of the medium 128 and $n_2$ is the refractive index of the body 110, and the optical maser also has a section substantially at right angles to the section of FIGURE 10b and substantially parallel to the axis 120 (in the present example, for instance, a section through the axis 120), in which the elongated portion 129 (see FIGURE 10a) of the medium 128 present between the reflecting members has a width $D_2$, and for the compliment of the roof angle of the translucent body 100 there applies that this complement differs by not more than 60%, preferably by not more than 40%, from an angle $\alpha_2$ determined by:

$$\alpha_2 = \frac{n_1}{n_3} \times \frac{D_2}{4L} \text{ radians}$$

wherein $n_3$ is the refractive index of the body 100.

In the present example $D_1 = D_2 = D$ and $n_2 = n_3$. The optical maser is made from the same materials as the optical masers described with reference to FIGURES 6 and 7a, 7b and 7c, and L and D are of the same magnitude in the three masers. The translucent body 110 corresponds to the translucent body 30 of FIGURE 6 and the formula for the angle $\alpha_1$ has the same form as the formula for the angle $\alpha$ in the optical maser of FIGURE 6. So the roof angle of the translucent body 110, (FIGURE 10b) preferably has the same value as the roof angle of the translucent body 30 (FIGURE 6).

The translucent body 100 (FIGURES 10a and 10b) corresponds to the translucent body 50 (FIGURES 7a, 7b and 7c) and the formula for the angle $\alpha_2$ has the same form as the formula for the angle $\alpha$ in the optical maser of FIGURES 7a, 7b and 7c. The roof angle of the translucent body 100 thus preferably has the same value as the roof angle of the said body 50.

Figure 9:
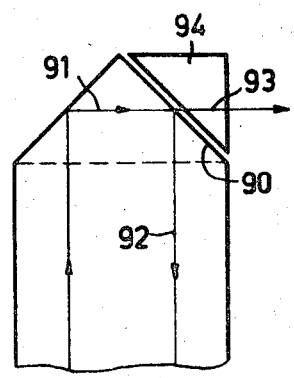
FIGURE 9 is a diagrammatic cross-sectional view of a part of an embodiment of an optical maser according to the invention in which an emerging beam is obtained by means of frustrated reflection.
Figure 11:
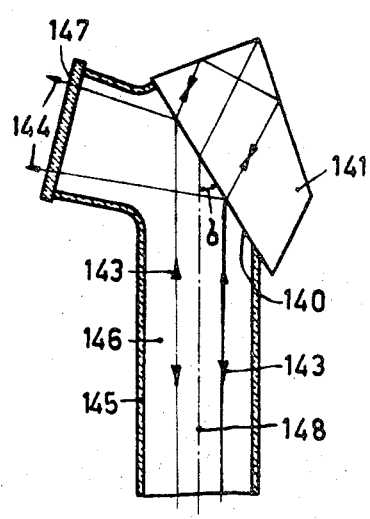
FIGURE 11 is a diagrammatic cross-sectional view of a portion of an embodiment of an optical maser according to the invention in which an emerging beam is obtained by reflection.

One or more emerging beams may be obtained by means of the phenomenon of frustrated total reflection on one or more of the reflecting surfaces of the translucent bodies 100 and 110 as previously described with reference to FIGURE 9. Another possibility of obtaining an emerging beam is shown diagrammatically in FIGURE 11. By causing the angle $\delta$ between an entrance surface 140 of a translucent body 141 and an axis 148 to deviate slightly from the complement of the Brewster angle reflection of incident radiation 143 occurs, resulting in emerging rays 144 which emerge through a window 147 provided in a holder 145 for a medium 146. The intensity of the emerging radiation 144 may be controlled by adjusting the said deviation from the complement of the Brewster angle.

Figure 12:
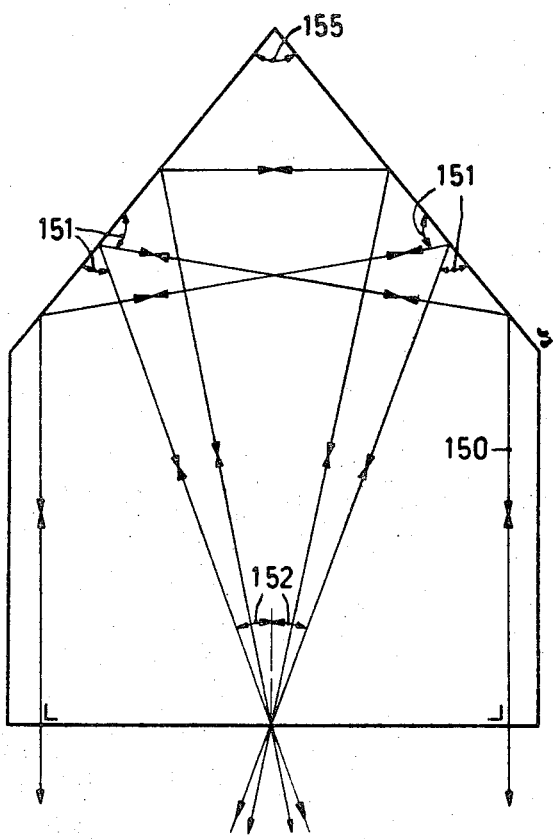
FIGURE 12 is a diagrammatic and cross-sectional view of a portion comprising the active medium of an embodiment of an optical maser according to the invention, in which a possible optical path, not closed, is shown.

It is to be noted that the path of rays illustrated in the preceding embodiments in FIGURES 1 to 11 are cyclic path of rays. However, path of rays which are not cyclic have also been observed, for example, a path of rays 150 as illustrated in FIGURE 12, for simplicity's sake in connection with an optical maser of the kind as previously described with reference to FIGURE 3. In the section shown in FIGURE 12, an apical angle 155 is 80 degrees of arc, the angles 151 are 60 degrees of arc and the angles 152 are 20 degrees of arc.

Figure 13:
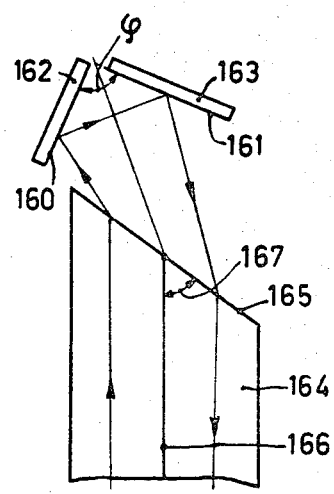
FIGURE 13 is a partial cross-sectional view of a final embodiment of an optical maser according to the invention.

It will be evident that the invention is not limited to the embodiments described and that many modifications are possible for an expert without passing beyond the scope of the invention. Thus, it is not necessary for the translucent bodies in the form of prisms to be in direct contact with the medium. The translucent bodies can also be arranged at a short distance from the medium and be separated therefrom, for example, by a translucent partition. Also the reflecting members making a roof angle need not comprise translucent bodies in the form of prisms. They may alternatively be constituted by two flat mirrors making a roof angle with each other. See, for example, FIGURE 13 which shows a section at right angles to reflecting surfaces 160 and 161 of a reflecting member comprising two mirrors 162 and 163. The mirrors 162 and 163 are, for example, metallized glass plates. The roof angle is the angle $\varphi$. The mirrors 162 and 163 may be adjustable so that the value of the angle $\varphi$ is adjustable. In the example shown, the medium comprises a solid body 164 (shown in part), for example, a ruby. A terminal surface 165 of the body 164 and an axis 166 of the body 164 make an angle 167 approximately equal to the complement of the Brewster angle, in order to prevent reflection losses at least substantially. The Brewster angle $\beta$ is in this case determined by $\tan \beta = n/n_1$ wherein $n$ is the refractive index of the substance present between the mirrors 162 and 163, for example, air and $n_1$ is the refractive index of the medium 164. A second reflecting member, for example, in the form of a single flat mirror is arranged at the end of the body 164 opposite the end surface 165, this end not being shown.

As may be seen, for example, from FIGURE 6 the radiation is incident on the entrance surface 31 in a slightly divergent manner. If the angle $\gamma_2$ is small, as is usually the case, this is not troublesome. However, if that angle is a comparatively large angle, the radiation is no longer incident on the inlet surface 31 at an angle substantially equal to the Brewster angle. In such a case the entrance surface may exhibit a bend along a line passing at right angles to the plane of the drawing through point 43 so that the values of the angles of incidence of the incident radiation again approximate the value of an angle equal to the Brewster angle.

What is claimed is:
1. An optical maser comprising an elongated active masing medium having an optical axis and a length parallel to the axis that substantially exceeds its width transverse to the axis, and a pair of reflecting means each disposed adjacent an end of said masing medium whereby radiation passing between the two reflecting means traverses the active masing medium, one of said reflecting means comprising two substantially flat reflecting surfaces disposed relative to each other to form a roof system defining an interior roof angle and a roof line at the apex of the roof angle where the two reflecting surfaces intersect, said roof angle being at least 25 seconds of arc smaller than an angle of 90° of arc and being larger than an angle of 80° of arc, the other of said reflecting means comprising a substantially flat reflecting surface substantially perpendicular optically to the said optical axis whereby substantially parallel rays can repetitiously and cyclically follow a closed optical path with a repetitive phase within the masing medium, and means for abstracting radiation from the said maser.

2. An optical maser as claimed in claim 1 in which the reflecting surface of said other reflecting means extends substantially parallel to the roof line of said one reflecting means, and in a section of the maser taken at right angles to the roof line of said one reflecting means, a line bisector of the roof angle extends approximately at right angles to the reflecting surface of said other reflecting means.

3. An optical maser as set forth in claim 1 wherein the reflecting surface of said other reflecting means extends substantially parallel to the said roof line, and the portion of said active medium located entirely between the reflecting means has a generally rectangular configuration whose broadest width is D and with a mean length L and an axis of symmetry parallel to the length L approximately coincident with a perpendicular to the reflecting surface of the other reflecting means from the roof line, said active medium portion, in a section at right angles to the said roof line, having a width D and a mean length L at which the complement of the roof angle is in the range of $0.4\alpha$ to $1.6\alpha$, where $$\alpha = \frac{n_1}{n_2} \times \frac{D}{4L} \text{ radians}$$

and where $n_1$ is the refractive index of the active medium and $n_2$ is the refraction index of the material present between the two reflecting surfaces forming the roof system.

4. An optical maser as claimed in claim 3 wherein said one reflecting means comprises a translucent prism having two side faces which constitute the reflecting surfaces and a third base face which constitutes the entrance surface for the radiation, said third face extending parallel to the reflecting surface of the other reflecting means.

5. An optical maser as claimed in claim 4 wherein the active medium is a solid body integral with the said translucent prism.

6. An optical maser as set forth in claim 1 wherein said one reflecting means comprises a translucent prism having two reflecting faces and an entrance face for radiation and defining three substantially parallel edges extending parallel to the reflecting surface of the other reflecting means, the said entrance face and the reflecting surface of the other reflecting means forming an angle approximately equal to the Brewster angle.

7. An optical maser as claimed in claim 6 wherein, in a section of the optical maser taken at right angles to the roof line of the translucent prism, the bisector of the roof angle has a position at which a light ray traveling from the roof angle along the bisector, after refraction by the entrance surface, is incident on the reflecting surface of the other reflecting means substantially at right angles.

8. An optical maser as claimed in claim 7 wherein the portion of said active medium located entirely between the reflecting means has a generally rectangular configuration whose broadest width is D and with a mean length L and an axis of symmetry parallel to the length L approximately coincident with a light ray traveling perpendicular to the reflecting surface of the other reflecting means which after refraction at the entrance surface intersects the roof line, said active medium portion, in a section at right angles to the said roof line, having a width D and a mean length L at which the complement of the roof angle is in the range of $0.4\alpha$ to $1.6\alpha$, where $$\alpha = \frac{n_1^2}{n_2^2} \times \frac{D}{4L} \text{ radians}$$

and where $n_1$ is the refractive index of the active medium and $n_2$ is the refractive index of the translucent prism.

9. An optical maser comprising an elongated active masing medium having an optical axis and a length parallel to the axis that substantially exceeds its width transverse to the axis, and a pair of reflecting means each disposed adjacent an end of said masing medium whereby radiation passing between the two reflecting means traverses the active masing medium, each of said reflecting means comprising two substantially flat reflecting surfaces disposed relative to each other to form a roof system defining an interior roof angle and a roof line at the apex of the roof angle where the two reflecting surfaces intersect, said roof angle being at least 25 seconds of arc smaller than an angle of 90° of arc and being larger than an angle of 80° of arc, the said roof lines of both reflecting means extending in directions substantially at right angles to one another whereby substantially parallel rays can repetitously and cyclically follow a closed optical path with a repetitive phase within the masing medium, and means for abstracting radiation from the said maser.

10. An optical maser as claimed in claim 9 wherein the roof lines are approximately at right angles to the longitudinal direction of the elongated portion of the medium present between the reflecting means, and the bisector of the roof angle associated with the relevant roof line extends approximately in the longitudinal direction of the elongated portion of medium present between the reflecting means.

11. An optical maser as claimed in claim 9 wherein the optical maser has a section at right angles to the roof line of one reflecting means as well as a section at right angles to the roof line of the other reflecting means, in which the complement of the roof angle of the relevant reflecting means lies between $0.4\alpha$ and $1.6\alpha$, where $$\alpha = \frac{n_1}{n_2} \times \frac{D}{4L} \text{ radians}$$

and where $n_1$ is the refractive index of the medium and $n_2$ is the refractive index of the material present between the reflecting surfaces of the relevant reflecting means, and in the said section, D is the width of the broadest substantially rectangular portion of the medium present between the reflecting means, of which portion the bisector of the relevant roof angle is approximately the axis of symmetry, and L is the mean length of the substantially rectangular portion.

12. An optical maser as claimed in claim 9 wherein each reflecting means comprises a translucent body having an entrance surface and two reflecting side faces, the entrance surface being approximately at right angles to the longitudinal direction of the elongated portion of the medium present between the reflecting means.

13. An optical maser as claimed in claim 9 wherein the two reflecting means comprise translucent bodies whose entrance surfaces are approximately parallel to each other and make an angle with the axis of the elongated portion of the medium present between the reflecting means, which angle is approximately equal to the complement of the Brewster angle, the reflecting surfaces and the entrance surface of one body defining three substantially parallel edges which intersect the said axis approximately at right angles, and the reflecting surfaces of the other body determine a roof line which occupies a position at which light rays extending parallel to the said axis and incident on the entrance surface of the other body, after refraction by the said entrance surface, intersect the roof line substantially at right angles.

14. An optical maser as claimed in claim 13 wherein a plane passing through the roof line of the other translucent body and approximately perpendicular to the entrance surface of the said body, is approximately the bisector plane of the roof angle of said body.

15. An optical maser as claimed in claim 13 wherein the optical maser has a section substantially at right angles to the three substantially parallel edges determined by the said side faces of one translucent body, in which the elongated portion of the medium present between the reflecting means, as measured approximately parallel to the axis of this portion, has a mean length L and a width $D_1$ at which the complement of the roof angle of said one body lies between $0.4\alpha$ and $1.6\alpha$, where:

$$\alpha_1 = \frac{n_1^2}{n_2^2} \times \frac{D_1}{4L} \text{ radians}$$

and where $n_1$ is the refractive index of the medium and $n_2$ is the refractive index of said one body, and the optical maser also has a section substantially at right angles to the first-mentioned section and substantially parallel to the said axis in which the elongated portion of the medium present between the reflecting means has a width $D_2$, at which the complement of the roof angle of the other body lies between $0.4\alpha_2$ and $1.6\alpha_2$, where $$\alpha_2 = \frac{n_1}{n_3} \times \frac{D_2}{4L} \text{ radians}$$

and where $n_3$ is the refractive index of the other translucent body.

16. An optical maser as claimed in claim 13 in which the optical maser contains a fluid medium.

References Cited

UNITED STATES PATENTS 3,308,395   3/1967   Sorokin _____ 331—94.5

FOREIGN PATENTS 608,711   3/1962   Belgium.

JEWELL H. PEDERSEN, *Primary Examiner.*

RONALD L. WIBERT, *Assistant Examiner.*